Patented Aug. 17, 1943

2,326,949

UNITED STATES PATENT OFFICE 2,326,949

FORMED TETRASODIUM PYROPHOSPHATE COMPOSITION AND PROCESS FOR MAKING SAME

Raymond J. Kepfer, Lakewood, Ohio, assignor to E. I. du Pont de Nemours & Company, Wilmington, Del., a corporation of Delaware No Drawing. Application November 29, 1940, Serial No. 367,747

11 Claims. (Cl. 252—135)

This invention relates to formed tetrasodium pyrophosphate compositions and processes for making them, and is particularly directed to processes in which tetrasodium pyrophosphate is dispersed in a fluid magma comprising hydrated trisodium phosphate and the mixture is solidified as discrete particles, and is further directed to the products thus produced.

Tetrasodium pyrophosphate, as powder or crystals, is poorly adapted for mixture with such detergents as soap flakes or shotted or flaked trisodium phosphate. It is desirable that detergent mixtures present a uniform appearance, that the amount of dust in the mixtures be a minimum and that the flakes or shot have sufficient strength to withstand the disruptive forces incurred in ordinary handling. In the forms heretofore available, tetrasodium pyrophosphate has not possessed these desirable characteristics.

If tetrasodium pyrophosphate could be flaked or shotted its physical form would be improved, but unfortunately procedures applicable to the flaking of various other materials are inapplicable to tetrasodium pyrophosphate. For instance, trisodium phosphate dodecahydrate may be flaked or shotted by dissolving it in its water of crystallization and solidifying the melt, either on a cooled drum from which the mix is scraped or by spraying it from a suitable nozzle into a cooled chamber. The decahydrate of tetrasodium pyrophosphate does not possess this ability to dissolve in its own water of crystallization; neither can a flakable or shottable melt be prepared by concentrating its aqueous solution. A method is described in U. S. Patent 2,041,448 to Zinn whereby extremely thin flakes are produced by melting anhydrous sodium pyrophosphate and solidifying the melt between rotating rolls, but the thinness of such films makes them inherently fragile and poorly adapted for mixture with other detergents.

Now I have found that compositions comprising tetrasodium pyrophosphate which are resistant to disintegration by ordinary handling and which are particularly well adapted for mixing with other detergent products may be prepared by dispersing tetrasodium pyrophosphate in a fluid magma comprising hydrated trisodium phosphate and solidifying the mixture in the form of discrete particles. The discrete particles of products so produced comprise tetrasodium pyrophosphate distributed in a trisodium phosphate matrix. They may be in flaked or shotted form and are readily soluble in water.

In the processes and products of my invention the tetrasodium pyrophosphate may be used either in the form of its decahydrate,

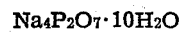

or as the anhydrous salt, $Na_4P_2O_7$. If the anhydrous salt is employed, some hydration may occur during and immediately after the solidification step so that the final product may contain either the anhydrous salt or a hydrate or mixtures thereof. The conditions may be such that the tetrasodium pyrophosphate is completely dissolved in the fluid magma before solidification or it may be merely suspended in the magma, preferably by means of mechanical agitation. If, in preparing the fluid magma, the anhydrous tetrasodium pyrophosphate is to be dissolved completely, it is preferable that the temperature of the water used for making the solution be below about 150° F. to facilitate hydration of the anhydrous salt, but if the hydrated salt is used the temperature of the water need not be thus controlled.

The trisodium phosphate employed for making the fluid magma may be a hydrate or the anhydrous salt dissolved in a suitable amount of water, since the anhydrous salt when associated with the amount of water required to form a hydrate is the equivalent of that hydrate.

When making the fluid magma it is preferable that the proportion of trisodium phosphate dodecahydrate to tetrasodium pyrophosphate decahydrate be at least about one to five by weight. If the anhydrous salts are used, it is preferred to maintain about the same proportion on an equivalent basis, that is, at least about one part by weight of anhydrous trisodium phosphate for each 6.91 parts of anhydrous tetrasodium pyrophosphate. I have found that unless there is at least these indicated proportions of trisodium phosphate present, the mass becomes difficultly workable and the product obtained is non-uniform in both chemical and physical character.

The processes and products of my invention may be better understood by reference to the following examples. It will be remembered that these examples are given only by way of illustration and not of limitation. Examples I and II show the complete dissolution of the phosphate components, followed by concentration and solidification of the fluid magma thus produced.

Example I

A solution was made up starting with anhydrous tetrasodium pyrophosphate and trisodium phosphate dodecahydrate, dissolving the components in an excess of water, and evaporating the excess by boiling to a water content just great enough theoretically to form tetrasodium pyrophosphate decahydrate, $Na_4P_2O_7 \cdot 10H_2O$, with the tetrasodium pyrophosphate present and trisodium phosphate dodecahydrate with the trisodium phosphate present. To obtain this result a solution comprising twenty parts by weight of water, four parts of anhydrous sodium pyrophosphate, and twenty parts of trisodium phosphate dodecahydrate was made up and 17.3 parts by weight of water was evaporated. This gave a fluid magma which was then flaked on a flaking drum. Flakes well suited for ordinary commercial usage, either alone or mixed with other flaked products such as soap, were obtained. The flakes were of satisfactory commercial size, being about 80 per cent in the range from −4 to +20 mesh, that is, 80 per cent would pass thru a screen having 4 meshes per inch but would be retained on a screen having 20 meshes per inch. The flakes had satisfactory bulking characteristics, the bulk being about 30 pounds per cubic foot. They were sufficiently strong and rigid to withstand ordinary handling and moving from place to place. Moreover, upon storage at ordinary atmospheric conditions they did not disintegrate or stick together.

Example II shows the results obtained following the method of Example I but using other proportions.

Example II

A solution was made up comprising thirty parts by weight of water, nine parts of anhydrous tetrasodium pyrophosphate and five parts of trisodium phosphate dodecahydrate. From this solution a fluid magna suitable for solidifying was prepared by evaporating twenty-four parts by weight of water. This fluid magma was then solidified by flaking it on a flaking drum.

The flakes obtained had the same physical characteristics as those obtained in Example I, being satisfactory in size, bulk, strength, rigidity, and storage characteristics.

The use of an excess of water to make the fluid magma, as illustrated in Examples I and II, is not necessary in the operation of a process of my invention, and in fact under certain circumstances considerable economies may be achieved by avoiding the presence of such an excess. Neither is it necessary that the tetrasodium pyrophosphate be hydrated. Thus, by merely suspending the anhydrous pyrophosphate in molten trisodium phosphate dodecahydrate at a temperature of about 200° F. or above, there is produced a fluid magma suitable for solidification in such forms as flakes or shot, as illustrated in Examples III and IV which follow.

Example III

In a suitable vessel equipped with a mechanical stirrer 33.5 parts by weight of trisodium phosphate dodecahydrate was melted. Into the melt was stirred 6.5 parts of anhydrous tetrasodium pyrophosphate and the fluid magma thus obtained was heated to 210° F., then solidified by flaking it on a flaking drum. Chemical examination of the flakes indicated that they contained approximately 84 per cent by weight of trisodium phosphate dodecahydrate and 16 per cent of anhydrous tetrasodium pyrophosphate. Physical examination of the flakes shows they were of satisfactory commercial size, being about 85 per cent in the range from −4 to +20 mesh, had satisfactory bulking characteristics, being about 35 pounds per cubic foot, were sufficiently strong and rigid to withstand ordinary handling and moving from place to place. Likewise, upon storage at ordinary atmospheric conditions they did not disintegrate or cake together.

By a procedure similar to that of Example III flakes comprising hydrated tetrasodium pyrophosphate were prepared as illustrated in Example IV.

Example IV

A mixture of 26.8 parts by weight of trisodium phosphate dodecahydrate and 3.6 parts of water was made up and melted by heating to about 210° F. Into this mixture was stirred 5.3 parts by weight of anhydrous tetrasodium pyrophosphate. There was obtained a fluid melt suitable for solidification by such methods as flaking or shotting. This melt was solidified by flaking it on an ordinary flaking drum.

The flakes thus formed came from the flaking drum in a soft, damp and warm condition and required careful handling to prevent crumbling or disintegration. However, after being allowed to remain scattered out in a thin layer for about twenty minutes they cooled off and became firm and rigid and thereupon had the same physical characteristics as described for the product of Example III. Upon chemical examination the flakes were found to contain 25 per cent by weight of tetrasodium pyrophosphate decahydrate and 75 per cent of trisodium phosphate dodecahydrate.

When anhydrous tetrasodium pyrophosphate is suspended in a melt of trisodium phosphate dodecahydrate with or without added water as described in Examples III and IV, it is preferable that the anhydrous pyrophosphate content of the mixture be not more than about 50 per cent by weight since difficulty may be experienced in obtaining a uniform homogeneous product if larger amounts of pyrophosphate are used.

The processes of my invention are broadly applicable to the production of solidified products in the form of discrete particles. Such discrete particles in the form of flakes have been illustrated in the foregoing Examples I to IV. Discrete particles may be produced in other forms such as, for instance, a shotted product. The preparation of a product in shotted form is illustrated in Example V which follows.

Example V

Tetrasodium pyrophosphate was dispersed in a fluid magma comprising hydrated trisodium phosphate by the procedure illustrated in Example III, 33.5 parts by weight of trisodium phosphate dodecahydrate being melted and 6.5 parts of anhydrous tetrasodium pyrophosphate being added and the mixture heated to about 210° F. The fluid mixture thus produced was sprayed into a shotting tower from a suitable nozzle. A shotted product was obtained which was uniform in size, sufficiently firm and strong to withstand vigorous handling, and well adapted by reason of these and its other physical characteristics for mixing with other shotted detergents such as shotted trisodium phosphate.

In the processes of my invention the apparatus used for solidifying the fluid melt will depend to a considerable extent upon the nature of product desired. The use of a drum flaker and of a shotting tower has been illustrated in the foregoing examples. The art is familiar with various other devices which are applicable to solidification problems of similar nature. For instance, instead of a drum flaker a belt flaker may be employed. Similarly, a cooled graining kettle may be used. Various other types of equipment for accomplishing this solidification step will be apparent to those skilled in the art.

While I have described my invention with relation to certain specific processes and certain specific products, it will be understood that one skilled in the art may readily employ numerous processes and related products without departing from the spirit of this invention.

I claim:

1. In a process for producing formed tetrasodium pyrophosphate compositions, the steps comprising dispersing tetrasodium pyrophosphate in a fluid, molten magma comprising trisodium phosphate and water, the proportion of trisodium phosphate calculated as dodecahydrate to tetrasodium pyrophosphate calculated as decahydrate being at least about one to five by weight, and solidifying the mixture as discrete particles.

2. In a process for producing formed tetrasodium pyrophosphate compositions, the steps comprising dispersing tetrasodium pyrophosphate in a fluid, molten magma comprising trisodium phosphate and water, the proportion of trisodium phosphate calculated as dodecahydrate to tetrasodium pyrophosphate calculated as decahydrate being at least about 1 to 5 by weight and the amount of water being not substantially more than sufficient to form the dodecahydrate of the trisodium phosphate present and the decahydrate of the tetrasodium pyrophosphate present, and solidifying the mixture as discrete particles.

3. In a process for producing formed tetrasodium pyrophosphate compositions, the steps comprising dispersing tetrasodium pyrophosphate in a fluid, molten magma comprising trisodium phosphate and water, the proportion of trisodium phosphate calculated as dodecahydrate to tetrasodium pyrophosphate calculated as decahydrate being at least about 1 to 5 by weight and the amount of water being not substantially more than sufficient to form the dodecahydrate of the trisodium phosphate present and the decahydrate of the tetrasodium pyrophosphate present, and flaking the mixture as discrete particles.

4. In a process for producing formed tetrasodium pyrophosphate compositions, the steps comprising dispersing tetrasodium pyrophosphate in a fluid, molten magma comprising trisodium phosphate and water, the proportion of trisodium phosphate calculated as dodecahydrate to tetrasodium pyrophosphate calculated as decahydrate being at least about 1 to 5 by weight and the amount of water being not substantially more than sufficient to form the dodecahydrate of the trisodium phosphate present and the decahydrate of the tetrasodium pyrophosphate present, and shotting the mixture as discrete particles.

5. In a process for producing formed tetrasodium pyrophosphate compositions, the steps comprising dispersing tetrasodium pyrophosphate in a fluid, molten magma comprising trisodium phosphate and water, the proportion of trisodium phosphate calculated as dodecahydrate to tetrasodium pyrophosphate calculated as decahydrate being at least about 1 to 5 by weight and the amount of water being not substantially more than sufficient to form the dodecahydrate of the trisodium phosphate present and the decahydrate of the tetrasodium pyrophosphate present and the amount of tetrasodium pyrophosphate being not more than about 50 per cent by weight of the slurry, and shotting the mixture as discrete particles.

6. A tetrasodium pyrosphosphate composition comprising discrete particles in which tetrasodium pyrophosphate is distributed in a matrix comprising hydrated trisodium phosphate, the proportion of trisodium phosphate calculated as dodecahydrate to tetrasodium pyrophosphate calculated as decahydrate being at least about one to five by weight.

7. A tetrasodium pyrosphosphate composition comprising discrete particles in which tetrasodium pyrophosphate is distributed in a matrix comprising trisodium phosphate and water, the proportion of trisodium phosphate calculated as dodecahydrate to tetrasodium pyrophosphate calculated as decahydrate being at least about 1 to 5 by weight and the amount of water being not substantially more than sufficient to form the dodecahydrate of the trisodium phosphate present and the decahydrate of the tetrasodium pyrophosphate present.

8. A tetrasodium pyrophosphate composition coprising flakes in which tetrasodium pyrophosphate is distributed in a matrix comprising hydrated trisodium phosphate, the proportion of trisodium phosphate calculated as dodechydrate to tetrasodium pyrophosphate calculated as decahydrate being at least about 1 to 5 by weight.

9. A tetrasodium pyrophosphate composition comprising flakes in which tetrasodium pyrophosphate is distributed in a matrix comprising trisodium phosphate and water, the proportion of trisodium phosphate calculated as dodecahydrate to tetrasodium pyrophosphate calculated as decahydrate being at least about 1 to 5 by weight and the amount of water being not substantially more than sufficient to form the dodecahydrate of the trisodium phosphate present and the decahydrate of the tetrasodium pyrophosphate present.

10. A tetrasodium pyrophosphate composition comprising shots in which tetrasodium pyrophosphate is distributed in a matrix comprising hydrated trisodium phosphate, the proportion of trisodium phosphate calculated as dodecahydrate to tetrasodium pyrophosphate calculated as decahydrate being at least about 1 to 5 by weight.

11. A tetrasodium pyrophosphate composition comprising shots in which tetrasodium pyrophosphate is distributed in a matrix comprising trisodium phosphate and water, the proportion of trisodium phosphate calculated as dodecahydrate to tetrasodium pyrophosphate calculated as decahydrate being at least about 1 to 5 by weight and the amount of water being not substantially more than sufficient to form the dodecahydrate of the trisodium phosphate present and the decahydrate of the tetrasodium pyrophosphate present.

RAYMOND J. KEPFER.